United States Patent
Takahashi et al.

[11] 3,908,400
[45] Sept. 30, 1975

[54] CONSTANT VELOCITY UNIVERSAL JOINT

[75] Inventors: Koichi Takahashi, Yokohama; Nobuteru Hitomi, Yokosuka; Taisuke Kizu, Fujisawa, all of Japan

[73] Assignee: Nissan Motor Company Limited, Yokohama, Japan

[22] Filed: Mar. 28, 1974

[21] Appl. No.: 455,800

[30] Foreign Application Priority Data
Mar. 29, 1973 Japan............................. 48-35955

[52] U.S. Cl. .................................................. 64/21
[51] Int. Cl.² ........................................ F16D 3/30
[58] Field of Search.......................... 64/21, 8, 7

[56] References Cited
UNITED STATES PATENTS

| | | | |
|---|---|---|---|
| 3,133,431 | 5/1964 | Zech | 64/21 |
| 3,370,441 | 2/1968 | Aucktor | 64/21 |
| 3,442,095 | 5/1969 | Devos | 64/21 |
| 3,475,924 | 11/1969 | Aucktor | 64/21 |
| 3,553,979 | 1/1971 | Noguchi et al. | 64/21 |

*Primary Examiner*—Samuel Scott
*Assistant Examiner*—Randall Heald

[57] ABSTRACT

The outer and inner members of a constant velocity universal joint have a plurality of equidistantly circularly spaced, part-helical ball, race grooves respectively, each of the grooves of the outer member being symmetrical to the corresponding groove of the inner member about an intersecting point where a power transmitting ball is located. The intersecting point lies on the circumference of a common plane which bisects the obtuse angle formed by the respective axes of the joint. A ball locating cage is mounted between the outer and inner members and has a plurality of circumferentially elongated apertures equal in number to the corresponding grooves to provide clearance which allows the balls to move along the corresponding grooves so that when the axes are tilted the outer and inner members move both circumferentially in opposite directions and axially to a displaced position as the balls take up their median position.

5 Claims, 5 Drawing Figures

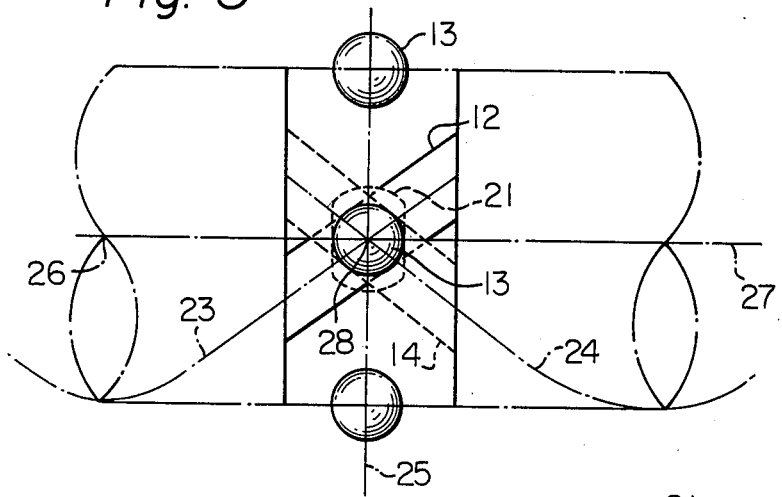
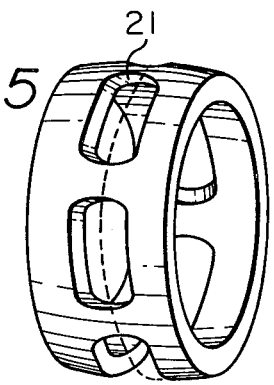
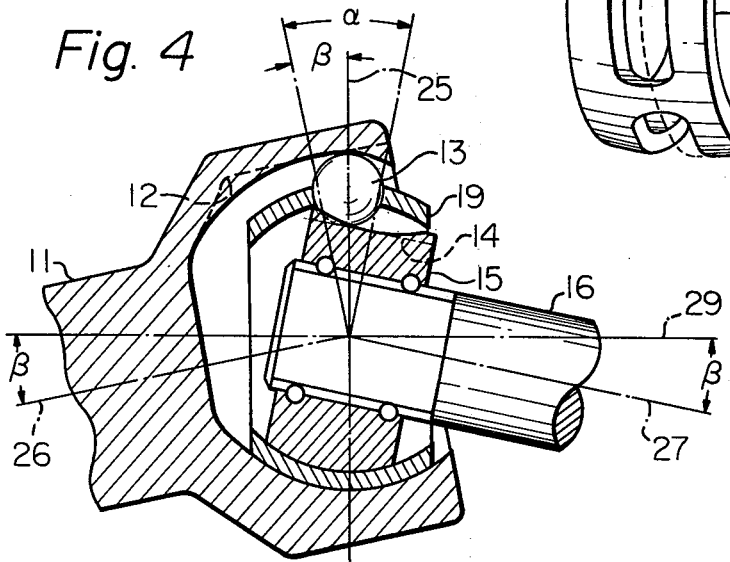

CONSTANT VELOCITY UNIVERSAL JOINT

The present invention relates generally to universal joints and more particularly to universal joints of the constant velocity type in which torque is transmitted from an input shaft to an output shaft through a variable angle by means of power transmitting balls movably engaged in grooves between the outer and inner members of the coupling or joint.

It has already been proposed in a ball universal joint which gives cyclic regularity of transmitted motion, to constrain the balls to operate in grooves in both the outer and inner members, so that when relative tilt occurs between these two members the ball takes up a median angle of tilt. In this way, contact is always maintained between the balls and the grooves of the outer and inner members at all angles of tilt, and torque and motion transmission from the driving to the driven parts of the coupling is smooth and regular. However, in order to maintain this full contact of the balls the grooves are of a longitudinally circular or arc shape so that the balls move, when taking up their median position, in an arc about the theoretical center of the occurring tilt.

In another prior construction of a ball universal joint, the outer and inner members have a plurality of longitudinally straight, axially parallel grooves and the balls are located in the corresponding grooves of the outer and inner members. Although this type of universal joint provides economical machining of the straight grooves, the angular movement of the joint is restricted to a limited range because of the short length of the grooves.

It is therefore an object of the invention to provide a constant velocity universal joint which is simple and compact in construction, using a plurality of first part-helical grooves extending in a clockwise direction about one of the axes of the joint and a plurality of second part-helical grooves extending in a counterclockwise direction about the other of said axes, each of the groove intersecting at the circumference of a common plane on which the power transmitting balls are located.

Another object of the invention is to provide a universal joint which is economically machined, using standard machine tools and simple machining practices.

Still another object of the invention is to provide a universal joint of the multiple ball type which permits the axes of the joint to be tilted to a greater angle than prior art joints.

A still further object of the invention is to provide a universal joint in which the power transmitting balls are maintained precisely in a common plane which bisects the obtuse angle formed by the input and output shafts so that torque is transmitted at a constant angular velocity from one shaft to the other.

Additional objects and advantages of the invention will become apparent from the following description and accompanying drawings, in which:

FIG. 3 is a schematic illustration of two intersecting helical grooves with a power transmitting ball located at the intersection of the two grooves;

FIG. 4 is an axial cross sectional view of the joint of FIG. 1 with its respective shafts in a tilt position; and FIG. 5 is a perspective view of a ball locating cage mounted between outer and inner members of the joint of FIG. 1.

Figure 1:
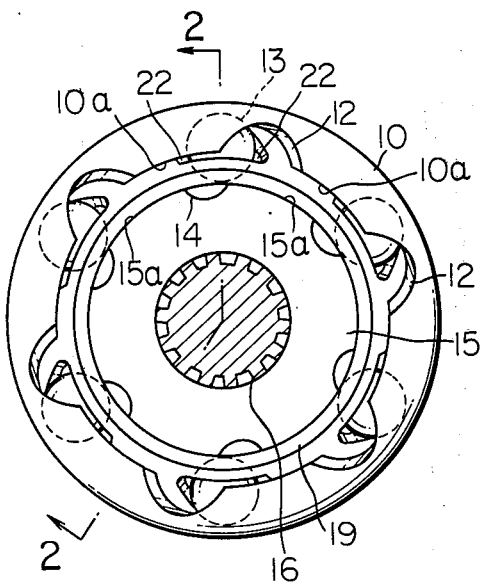
FIG. 1 is an axial view of a constant showing a center shaft of the joint in section.
Figure 2:
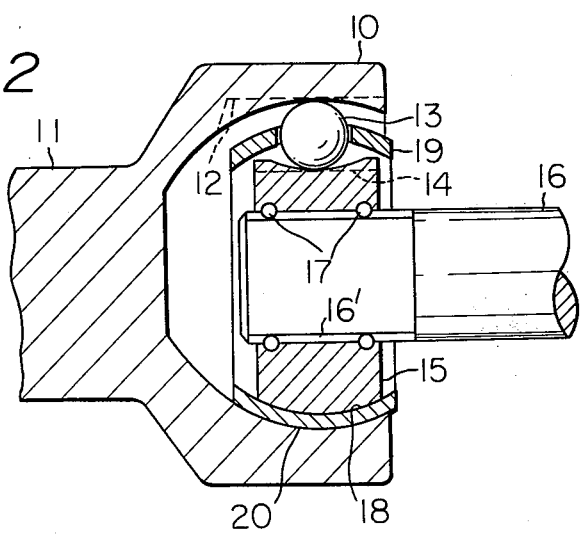
FIG. 2 is a longitudinal cross sectional view of the joint shown in FIG. 1, the section being taken on line 2—2 of FIG. 1.

Referring to FIGS. 1 and 2, a numeral 10 indicates an outer member or race with an input or driving shaft 11 integrally connected thereto and in which are cut a series of part-helical grooves 12, equally pitched about the internal circumference of the outer member 10 and wherein are movably engaged a number of steel balls 13 which in turn movably engage in part-helical grooves 14 cut in an inner member or race 15 which is supported upon and connected to a shaft 16 through splines 16' and support rings 17.

In a condition of no tilt shown in FIG. 1, torque applied to the driving shaft 11 is transmitted through the intervening components to the driven shaft 16. Although as shown in FIG. 1, six equally spaced balls 13 and corresponding grooves are provided, the invention relates to any number of balls and corresponding grooves including odd numbers of balls and grooves provided they are equally spaced.

The inner member 15 has a spherical outer surface 18, and member 15 together with its related shaft 16 are rotatable in concentricity with the outer member 10 with the spherical surface 18 slidably bearing against an inner spherical surface of a part-spherical ball retainer or locating cage 19 which in turn bears against an inner spherical surface 20 of the outer member 10. Besides centering and locating the inner member 15, the cage 19 has another function in that by means of elongate circumferential slots or apertures 21 spaced about its circumference it locates and guides the balls 13 so that under any tilt condition, the centers of all balls 13 lie in the same plane of rotation which bisects the obtuse angle formed by the two axes of the shafts 11 and 16. As shown in FIG. 5, the apertures 21 are cut to provide clearances 22 in the circumferential length of the cage 19 to allow the ball to move circumferentially as necessary to find accurate centering at the intersection of the part-helical grooves 12 and 14 which will be described hereinbelow.

In order to retain the centers of the balls in a common plane of rotation which bisects the obtuse angle between axes 26 and 27 of the shafts 11 and 16 respectively, as shown in FIG. 4 together with the cage 19, each of the part-helical grooves 12 of the outer member 10 is parallel to a helix 23 whose diameter is the same as that of the circumference of the centers of the balls 13 (FIG. 3) and each of the part-helical grooves 14 of the inner member 15 is parallel to a helix 24 which intersects the helix 23 at a common bisector 25 and has the same diameter and pitch as those of helix 23. The helix 23 of the groove 12 is wound in a given direction about the axis 26 of shaft 11 and helix 24 of groove 14 is wound in opposite direction about the axis 27 of shaft 16. It will be seen that the helixes 23 and 24 are symmetrical to each other about an intersection 28 thereof.

In FIG. 4 the joint is shown displaced through an angle of tilt $\alpha$ and it will be seen that the ball 13 in occupying a median angle $\beta$ is in satisfactory contact with the groove 12 in the outer member 10 and groove 14 in the inner member 15. The plane of all the balls will now be on the bisector 25 at angle β from the vertical plane, by virtue of the intersecting part-helical grooves and the ball cage 19. The ball shown in FIG. 4 is in vertically uppermost position and similarly all other balls at intermediate positions of rotation will be positioned by the ball cage and the intersecting part-helical grooves with their centers on the bisector 25. It will now be seen that if the balls 13 are viewed along the horizontal axis 29 they occupy an elliptical disposition which is a bisector plane of two cylindrical helixes 23 and 24 when they have moved longitudinally forwards (in the upper segment) and backwards (in the lower segment) from the vertical line 25 and further if the balls are now viewed along the tilted axis of the shaft they occupy a circular disposition relative to that axis even though the balls are displaced forwards or backwards from the vertical line 25. In order to maintain the balls in the common plane at all tilt angles, each of the two intersecting grooves 12 and 14, and hence the outer and inner members must move in opposite circumferential directions. The elongate circumferential apertures 21 of cage 19 thus allow the balls 13, when taking up their median position, to move in the corresponding grooves so that the outer and inner members move circumferentially in opposite directions. Because of this it follows that cyclic uniformity of motion must be maintained because the balls are at all times, at all angles of tilt, rotating in elliptical paths on the common plane relative to the motion input and relative to the motion output of the joint. It also follows that in order to maintain these elliptical paths on the ball bisector plane 25 the balls move in a circular path relative to the respective axes 26 and 27.

By utilizing corresponding intersecting part-helical grooves 12 and 14 on the outer and inner members 10 and 15, respectively, it is possible to create a constant velocity universal joint which will permit a greater angle of tilt than is available with the prior art construction having straight axially parallel grooves as referred to above and permit the use of standard machine tools without requiring special machining techniques. For example, the part-helical grooves 12 of the outer member 10 may be provided by machining a work using a pinion cutter. First, axially parallel grooves of a diameter smaller than the the grooves 12 are machined using conventional drills so that the axial grooves are contained in the passage of the grooves 12. Second, the pinion cutter is used for trimming the remaining portions of the grooves by twisting the cutter circumferentially in conjunction with a helical guide. A helical broach may be used for machining the part-helical grooves in the outer member. Further, the outer and inner members intersect at variable angles with the spherical surfaces of lands 10a and 15a of the respective outer and inner members bearing against the outer and inner spherical surfaces of the cage 19. Since the intersecting part-helical grooves of the outer and inner members have the effect of locating or confining the balls at an intersecting point lying on the bisector plane so that torque is transmitted from the driving to the driven shafts of the joint at a constant velocity ratio of unity at all angles of tilt.

What is claimed is:

1. A constant velocity universal joint comprising a shaft, an outer and an inner member whose axes intersect at variable angles and mounted concentrically with and axially surrounding said shaft, said inner member being supported on and connected to said shaft, a plurality of lands located on said outer and inner members for forming a plurality of equidistantly circularly spaced, intersecting outer and inner part-helical ball race grooves respectively, the outer ball race groove being parallel to a first helix wound in one direction of rotation about the axis of said outer member and the inner ball race groove being parallel to a second helix wound in the opposite direction of rotation about the axis of said inner member so that said first and second helixes intersect at various points, a plurality of power transmitting balls movably engaging the corresponding grooves of said outer and inner members for transmitting torque from one of said members to the other of said members, and a ball locating cage mounted intermediate the outer and inner members for locating said balls with their center points on a common plane which bisects the obtuse angle formed by the axes of said members and having an outer and an inner spherical surface for pivotally engaging the lands on said inner and outer members, respectively.

2. A universal joint as claimed in claim 1, wherein said two helixes have an equal pitch and a diameter being equal to the diameter of the circumference on which the centers of said power transmitting balls are located.

3. A universal joint as claimed in claim 1, wherein each of said power transmitting balls are located at the intersection on the corresponding outer and inner race grooves.

4. A universal joint as claimed in claim 1, wherein the lands of said outer and inner members have inner and outer spherical surfaces and said ball locating cage has an inner spherical surface.

5. A universal joint as claimed in claim 1, wherein said ball locating cage has a plurality of elongate circumferential apertures for receiving said power transmitting balls therein.

* * * * *